(12) United States Patent
Srikanteswara et al.

(10) Patent No.: US 10,681,167 B2
(45) Date of Patent: Jun. 9, 2020

(54) DISTRIBUTED COMPUTING RESOURCES IN AN INFORMATION CENTRIC NETWORK

(71) Applicant: Intel Corporation, Santa Clara, CA (US)

(72) Inventors: Srikathyayani Srikanteswara, Portland, OR (US); Hassnaa Moustafa, Portland, OR (US); Jessica C. McCarthy, Dublin (IE); Jeffrey Christopher Sedayao, San Jose, CA (US); Eve M. Schooler, Portola Valley, CA (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 15/487,841

(22) Filed: Apr. 14, 2017

(65) Prior Publication Data

US 2018/0145927 A1  May 24, 2018

Related U.S. Application Data

(60) Provisional application No. 62/424,985, filed on Nov. 21, 2016.

(51) Int. Cl.
*H04L 12/911* (2013.01)
*H04L 29/08* (2006.01)
(Continued)

(52) U.S. Cl.
CPC .......... *H04L 67/2842* (2013.01); *G06F 16/23* (2019.01); *G06F 16/9574* (2019.01); *H04L 29/08* (2013.01); *H04L 41/5006* (2013.01); *H04L 41/5009* (2013.01); *H04L 41/5025* (2013.01); *H04L 41/5035* (2013.01); *H04L 43/12* (2013.01); *H04L 43/16* (2013.01); *H04L 45/04* (2013.01); *H04L 45/14* (2013.01); *H04L 45/60* (2013.01); *H04L 45/74* (2013.01); *H04L 47/20* (2013.01); *H04L 47/286* (2013.01);
(Continued)

(58) Field of Classification Search
CPC ........................... H04L 47/783; H04L 67/327
See application file for complete search history.

(56) References Cited

U.S. PATENT DOCUMENTS

| 8,024,395 B1 * | 9/2011 | Odom | G06F 9/5072 709/201 |
|---|---|---|---|
| 2009/0313636 A1 * | 12/2009 | Barsness | G06F 9/5038 718/105 |
| 2015/0042240 A1 * | 2/2015 | Aggarwal | H04W 4/70 315/292 |

OTHER PUBLICATIONS

Mosko et al., "CCNX Semantics," Jan. 11, 2016. (Year: 2016).*
(Continued)

*Primary Examiner* — Andrew C Georgandellis
(74) *Attorney, Agent, or Firm* — Schwegman Lundberg & Woessner, P.A.

(57) ABSTRACT

System and techniques for distributed computing resources in an information centric network (ICN) are described herein. A request may be received at a node in the ICN. The request may include identification of a computing resource set and a timing threshold. Resources that correspond to a member of the computing resource set may be locked. The node may communicate a response to the request. The response may include an indication that performance of the member of the computing resource is possible and a time-period in which confirmation may be received.

15 Claims, 6 Drawing Sheets

(51) Int. Cl.

| | |
|---|---|
| *H04L 12/721* | (2013.01) |
| *G06F 16/23* | (2019.01) |
| *H04L 12/24* | (2006.01) |
| *G06F 16/957* | (2019.01) |
| *H04L 12/26* | (2006.01) |
| *H04L 29/06* | (2006.01) |
| *H04L 12/841* | (2013.01) |
| *H04L 12/773* | (2013.01) |
| *H04L 12/741* | (2013.01) |
| *H04L 12/813* | (2013.01) |
| *H04L 29/12* | (2006.01) |
| *H04L 12/715* | (2013.01) |

(52) U.S. Cl.
CPC ........ *H04L 47/783* (2013.01); *H04L 61/2076* (2013.01); *H04L 67/10* (2013.01); *H04L 67/1097* (2013.01); *H04L 67/12* (2013.01); *H04L 67/16* (2013.01); *H04L 67/2876* (2013.01); *H04L 67/327* (2013.01); *H04L 67/42* (2013.01); *H04L 69/22* (2013.01)

(56) References Cited

OTHER PUBLICATIONS

"Extensible Authentication Protocol Method for 3rd Generation Authentication and Key Agreement (EAP-AKA)", https://tools.ietf.org/html/rfc4187 Accessed on Feb. 13, 2018, (Jan. 2006), 80 pgs.
"802.1x Authentication Chapter 9", Arubanetworks, http://www.arubanetworks.com/techdocs/ArubaOS_60/UserGuide/802.1x.php Accessed on Feb. 13, 2018, 32 pgs.

\* cited by examiner

305

| FIB | |
|---|---|
| NAME | NEXT |
| /ABC.ORG | ROUTER B |
| /WEATHER.DATA | PUBLISHER 1 |

310

| C-FIB | | |
|---|---|---|
| TYPE OF COMPUTATIONAL RESOURCE | SIZE, ATTRIBUTES | NEXT |
| DEEP LEARNING | 4 LAYERS | CR D |
| FFT ENGINE | 1024 | ROUTER C |
| GENERAL PURPOSE COMPUTING | 4 CORES, 1.5GHZ | CR D |

DISTRIBUTED COMPUTING RESOURCES IN AN INFORMATION CENTRIC NETWORK

CLAIM OF PRIORITY

This patent application claims the benefit of priority, under 35 U.S.C. § 119, to U.S. Provisional Application Ser. No. 62/424,985, titled "INFORMATION-CENTRIC NETWORKING METHODS AND APPARATUSES" and filed on Nov. 21, 2016, the entirety of which is hereby incorporated by reference herein.

TECHNICAL FIELD

Embodiments described herein generally relate to computer network communications and more specifically to distributed computing resources in an information centric network (ICN).

BACKGROUND

The Internet of Things (IoT) is an emerging class of devices and connections. Generally, IoT devices integrate components that may have previously lacked communication mechanisms with each other and other networked entities to widely provide access to the IoT device. Example IoT devices may include sensors, such as cameras, thermometers, moisture sensors, light sensors, motion sensors, and the like. Other IoT devices may include appliances (e.g., a refrigerator, oven, washing machine, dryer, water heater, water softener, etc.), home automation components (e.g., lights, thermostats, locks, doors, etc.), industrial automation (e.g., machinery, lights, access mechanisms, etc.), and even furniture.

Often IoT devices are resource constrained. The constrained resources of the IoT device may include power (e.g., battery powered including devices with limited recharge capabilities), computation (e.g., low frequency or capability processors, missing hardware acceleration, etc.), or storage. Further, because IoT devices tend to be on network edges, and tend to be numerous, IoT devices may stress network uplinks because networks have tended to be designed to provide downlink bandwidth.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example of a forwarding interest base (FIB) table and a computational forwarding interest base (C-FIB) table, according to an embodiment.

DETAILED DESCRIPTION

Figure 1:
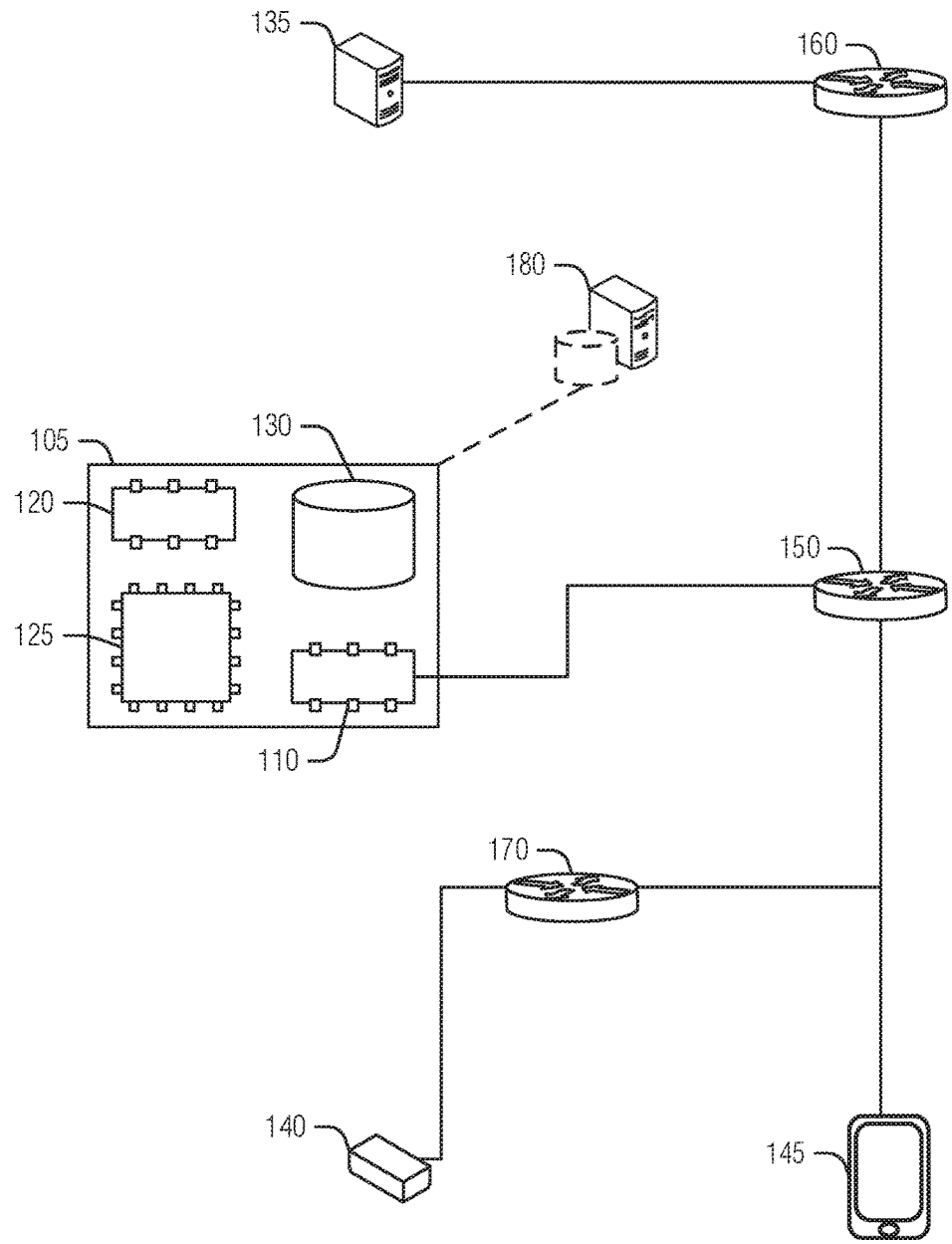
FIG. 1 is a block diagram of an example of an environment including a system for distributed computing resources in an ICN, according to an embodiment.

Traditional networks may adapt poorly to IoT demands. An Information Centric Network (ICN) may address many challenges introduced by IoT installations. ICN is an umbrella term for a new networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine, and does not use addresses. Instead, to get content, a device requests named content from the network itself. The content request may be called an interest and transmitted via an interest packet. As the interest packet traverses network devices (e.g., routers), a record of the interest is kept, for example, in a pending interest table. When a device has content matching the name in the interest is encountered, that device may send a data packet in response to the interest packet. Typically, the data packet is tracked back through the network to the source by following the traces of the interest left in the network devices.

Matching the named data in an ICN may follow several strategies Generally, the data is named hierarchically, such as with a universal resource identifier (URI). For example, a video may be named www.somedomain.com/videos/v8675309. Here, the hierarchy may be the publisher, "www.somedomain.com," a sub-category, "videos," and the canonical identification "v8675309." As an interest traverse an ICN, equipment will generally attempt to match the name to a greatest degree. Thus, if an ICN device has a cached item or route for both "www.somedomain.com/videos" and "www.somedomain.com/videos/v8675309," the ICN device will match the later for an interest packet specifying "www.somedomain.com/videos/v8675309." In an example, an expression may be used in matching by the ICN device. For example, the interest packet may specify "www.somedomain.com/videos/v8675*" where '*' is a wildcard. Thus, any cached item or route that includes the data other than the wildcard will be matched. In an example, additional meta-data may be attached to the interest packet, the cached data, or the route, to provide an additional level of matching. For example, the data name may be specified as "www.somedomain.com/videos/v8675309," but also include a version number—or timestamp, time range, endorsement, etc. In this example, the interest packet may specify the name and the version number, or version range, desired. The matching may then locate routes or cached data matching the name and then perform the additional comparison of meta-data or the like to arrive at an ultimate decision as to whether data or a route matches the interest packet for responding to the interest packet or forwarding the interest packet respectively.

ICN has advantages over host-based networking because the data segments are individually named. This permits aggressive caching throughout the network as a network device may provide a data packet in response to an interest as easily as an original author. Accordingly, it is less likely that the same segment of a network will transmit duplicates of the same data requested by different devices. Such an architecture is useful when a network branches from a central information provider to many leaves, such as occurs in many IoT deployments.

Fine grained encryption is another feature of many ICNs. A typical data packet includes a name for the data that matches the name in the interest packet. Further, the data packet includes the requested data and may include additional information that may, for example, be used to filter similarly named data (e.g., by creation time, expiration time, version, etc.). To address malicious entities providing false information under the same name, the data packet may also encrypt its contents with a publisher key or provide a cryptographic hash of the data and the name. Thus, knowing the key (e.g., from a certificate of an expected publisher) allows the recipient to ascertain whether the data is from that publisher. This technique also allows the aggressive caching of the data packets throughout the network because each data packet is self-contained and secure. This contrasts with many host-based networks that rely on encrypting a connection between two hosts to securely communicate. With connection encryption, the network devices have no access to the data to cache the data.

Example ICNs include content centric networking (CCN), as specified in the Internet Engineering Task Force (IETF) draft specifications for CCNx 0.x and CCN. 1.x, and named data networking (NDN), as specified in the NDN technical report DND-0001.

The data-centric nature of ICN makes it well suited to the IoT environment because of the sheer volume of data being created by some IoT deployments. However, a tremendous amount of the IoT data is being generated at the edges of the network where the data is commonly being distributed to groups of interested parties or flowing upstream towards the cloud for further processing, analysis or storage. Consequently, it may not be possible for the network to handle all of the data, at least not in its original state. Thus, ICN IoT networks may benefit if the IoT devices perform transformations on the data (e.g., analytics, aggregation, compression, sub sampling, transcoding, etc.) themselves, or new the edge.

Fog (e.g., edge) computing is emerging as a form of cloud computing that distributes cloud functionality (such as processing, analytics, networking, storage, etc.) closer to the data sources. Because current ICN models were designed to support data dissemination and caching, there is presently no ICN solution to address data processing for edge devices. What is needed is an improved ICN to correlate data processing requirements with the computational and caching resources of the ICN nodes. This would allow the ICN to perform load balancing at the edge to help with efficient processing of IoT data as well as efficient data dissemination and storage (e.g., caching).

To address the issues noted above, an ICN resource discovery apparatus is described. The resource discovery allows ICN nodes to share information about their platform resources (e.g., processing capabilities, memory capacity, video or multimedia capabilities, connectivity types, etc.), independent of physical location. Further, embodiments may also implement a technique to route data to computing resources or to route processing to the data, whichever is optimal. Thus, ICN may provide a more efficient partner technology to fog computing or IoT deployments.

ICN resource discovery may be implemented by extending the use of ICN interest packets and data packets for resource discovery in addition to these packets' traditional data discovery and retrieval functions. For example, when an ICN node sends out a query about resources in its vicinity, the nodes that are willing (e.g., configured) to share information about their computational resources reply to the query giving information about the resources available to the requester. The requesting node may then make use of these resources to offload (e.g., to its neighbors) ICN node information to be processed on the available resources in the vicinity. The resource discovery may be cognizant of application requirements to ensure that the reported available resource is available and has the capabilities required to carry out the task as specified by the requestor. In an example, two factors may be considered by the resource discovery. A first factor is whether there are optimal proximate resources to carry out the task. A second factor is whether there are optimal routing paths to those resources. In an example, the optimal routing may employ as global a view of the ICN as possible to help ensure that application requirements are served to the best of the network's ability.

FIG. 1 is a block diagram of an example of an environment including 100 a system 105 for distributed computing resources in an ICN, according to an embodiment. The system 105 includes a network interface 110, a data store 130, a resource 120, and a controller 125. These components are implemented (e.g., realized) in computer hardware (e.g., circuitry). In an example, the system 105 is an ICN node and, when in operation, communicatively coupled (e.g., via the network interface 110) to one or more other ICN routers, such as router 150, router 160, or router 170, or to other ICN nodes, such as server 135, tablet 145, or device 140 (e.g., a sensor, camera, transmitter, etc.). The system 105 embodies an enhanced ICN node to enable resource sharing in an ICN.

The network interface 110 is arranged to receive a request at a node in the ICN. Here, the request includes identification of a computing resource set. The computing resource set is a collection of one or more elements (e.g., clock cycles, storage space, tasks to complete, encoding, etc.) requested. The computing resource set members may have further divisions, such that a computing resource set member embodies a task and sub-elements of the member detail computer hardware or software to complete the task.

In an example, the request includes a timing threshold. The timing threshold is an outer-limit of time in which the computing resource set is satisfied. In an example, the time is measured from a last hop (e.g., the last node to forward the request to the system 105). In an example, the time is measured from the node originating the request. The timing threshold may be considered the maximum latency tolerated from the computing resource set.

The controller 125 is arranged to lock resources (e.g., resource 120) that correspond to a member of the computing resource set. In an example, the resource 120 is at least one of a processor, a graphical processing unit (GPU), a digital signal processor (DSP), neuromorphic core, or a field programmable gate array (FPGA). In an example, the resource 120 is an application specific integrated circuit (ASIC). The ASIC provides hardware acceleration for a computational task, such as performing a discrete Fourier transform (DFT), a fast Fourier transform (FFT), encryption, or other encoding/decoding. In an example, the resource 120 is a main memory (or other byte addressable) device. In an example, the resource 120 is mass storage. In an example, the resource 120 implements or stores an algorithm, such as an artificial neural network (ANN), classifier, statistics or analytics package, etc.

The controller 125 is arranged to communicate (e.g., via the network interface 110) a response to the request. Here, the response includes an indication that performance of the member of the computing resource is possible, in an example, the response includes a time-period in which confirmation may be received. To complete the action, the controller 125 is arranged to receive (e.g., via the network interface 110) an action request to perform a task on the resources. The controller 125 may then perform the task on the resources and respond (e.g., via the network interface 110) to the action request with performance results from the task.

In an example, the controller 125 is arranged to determine that a second member of the computing resource set cannot be met by the system 105. Here, the second member may correspond to a second task in the action request. In an example, the second task may use the performance results (e.g., the result produced after the first task is performed by the system 105) as an input. The controller 125 is arranged to communicate an interest for the second member of the computing resources set, receive a reply from a second node in response to the interest for the second member, and communicate the second task and the performance results to the second node. In an example, the second node made the request. This is a scenario whereby the original requesting node turns out to be the most capable node to complete the task. In an example, the second member included an algorithm, the system 105 had the algorithm (e.g., in the data store 130), and the second node did not have the algorithm. In this example, the controller 125 is arranged to communicate the algorithm to the second node. This last example illustrates moving processing to data rather than moving data to processing. That is, generally, the distributed computing involves a node providing data to another node where that other node processes the data. Here, the requesting node will perform the computational tasks after being augmented (e.g., with the algorithm). Thus, the data did not leave the requesting node, but processing capability was delivered to that node.

Thus, in a simple scenario, the device 140 may seek an FFT accelerator to perform a time-domain to frequency domain conversion of a radio signal. The device 140 forwards a request (e.g., a resource interest packet) to the ICN with a name indicating that FFT hardware is sought. The system 105 receives the request and matches it to the resource 120. The system 105 then reserves (e.g., holds, locks, etc.) the resource 120 and responds to the request. The device 140 may then act on the response, instructing the system 105 to perform the FFT on a signal provided by the device 140. The signaling may vary, for example, depending on the ICN's particulars. For example, the system 105 may follow the response to the original request with a request of its own (e.g., a task-fulfillment interest packet) that is routed to the device 140. The device 140 may then respond with a data packet including the signal and also send an interest packet for the result. However, other ICN messages may be employed, such as acknowledgments (ACK) packets or the like.

The system 105 may also participate in more complex resource fulfillment scenarios. In these scenarios, the system 105 may not include a member of the set of computing resources, or may not be able to complete a member of the set of computing resources within an allotted time. In these scenarios, the system 105 may forward the request, or part of the request, on to another router (e.g., router 150) or node (e.g., node 135). To facilitate such routing the system 105 (e.g., the controller 125) maintains a computational forwarding interest base (C-FIB) (e.g., in the data store 130) for routes to other nodes. A C-FIB is a computational analogue to the FIB typically maintained in an ICN node. Thus, in an example, when the system 105 receives a computational resources interest packet, the system 105 (e.g., via the controller 125) is arranged to add an entry to the C-FIB for a device that responds to the computation resources interest packet. In an example, a C-FIB entry includes a type identification and a node. In an example, the type is one of an algorithm, a performance metric, or storage. In an example, the node in the entry is a next hop in the information centric network to a provider node. In an example, the C-FIB entry also includes a value for the type. For example, if the type is a computation resource of central processor, the value may include a frequency (e.g., 1.4 gigahertz), a make or generation, etc., where if the type is main memory the value may be a size in bytes.

In an example, computation resource routing may be facilitated by a central directory, such as directory 180. Generally, the directory 180 does not contain computing resources to fulfill requests, but rather maintains state information on the computing resources of other nodes. This centralization of computing resource information may facilitate request routing in, for example, time sensitive tasks. In an example, the system 105 is a directory. In this example, the original response to the request indicates a second node (e.g., router 170) that hosts the resources. In an example, to lock the resources, the controller 125 is arranged to communicate a lock to the second node. In an example, the lock includes a timeout. In this example, the second node is arranged to remove a local lock (e.g., a lock specific to the second node) on the resources when the timeout expires without further communication from the system 105. In an example, the controller 125 is arranged to maintain a local lock at the system 105 without communicating to the second node. In an example, the system 105 will not respond (e.g., refrain from responding) to other requests concerning the resources while the local lock is effective. The use of local locks and time-outs reduces signaling overhead.

In an example, the system 105 is arranged to obtain computing resource inventories from a set of nodes and use the computing resource inventories to respond to computing resource requests. In an example, to obtain the computing resources inventories, the system 105 is arranged to communicate (e.g., via the network interface 110) a discovery interest to the ICN and receiving a response from a member of the set of nodes to the discovery interest. In an example, the discovery interest includes a time-to-live parameter. In this example, the discovery interest is not removed from information centric node pending interest tables until the time-to-live expires regardless of the number of transmissions that are provided in response to the discovery interest. This last example is a deviation from typical ICN interest packet handling where the pending interest is swept up (e.g., removed) after a responsive data packet passes through the node holding the pending interest. Instead, the maintenance of the discovery interest permits multiple responses to the interest, facilitating a more complete view of the available computing resources across several nodes.

Figure 2:
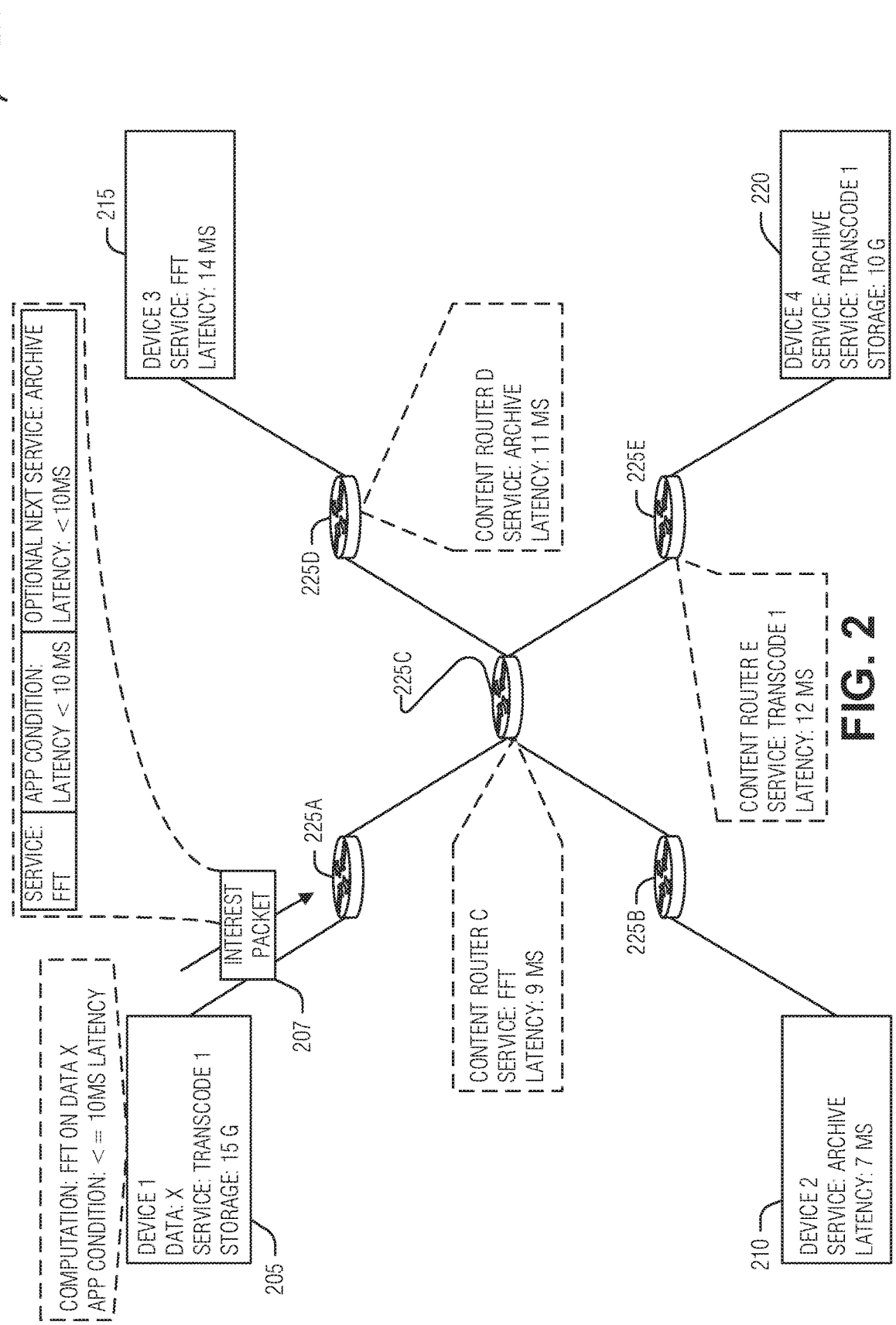
FIG. 2 illustrates a block diagram of an example of a use case for distributed computing resources in an ICN, according to an embodiment.

FIG. 2 illustrates a block diagram of an example of a use case for distributed computing resources in an ICN 200, according to an embodiment. The elements are techniques illustrated in FIG. 2 may be implemented by the hardware discussed above with respect to FIG. 1, or may be combined with the techniques described above.

The ICN 200 includes several devices (device 1 205, device 2 210, device 3 215, and device 4 220) and content routers 225 (content router A 225A, content router B 225B, content router C 225C, content router D 225D, and content router E 225E). The devices and content routers 225 are annotated with supported services other than caching and other conditions. The following details are presented in the context of device 1 205 marshalling resources to process data X by FFT in no more than ten milliseconds and archive the result. To initiate the process, device 1 205 issues an interest packet 207. The interest packet 207 includes the service (e.g., FFT), optional conditions to perform the service (e.g., less than ten milliseconds of latency, and optional next steps (e.g., archive the result also in less than ten milliseconds). In an example, an optional next step default is to return the results back to device 1 205.

After device 1 205 issues the interest packet 207 into the ICN 200, devices capable of meeting the requirements specified in the interest packet 207 respond back to device 1 205. In the example illustrated in FIG. 2, while both device 3 215 and content router C 225C have FFT capabilities, only content router C 225C meets the ten milliseconds or less latency condition. Thus, content router C 225C responds to device 1 205 and indicates that it is accepting the task.

Once content router C 225C receives and processes data X, content router C 225C forwards the result to the next service (e.g., puts for another interest packet specifying the service 'archive'). As illustrated, device 2 210 is the only device that has the service and meets the conditions (content router D 225D has the archive service but also has too much latency). In an example, latency is measured roundtrip from device 1 205 because device 1 205 provided the original interest packet 207.

The basic scenarios described above may be augmented in several ways. For example, different naming scheme classifications may be used. An example may include different orderings of different name elements. For instance, the most important processing factor may be moved to a higher point on a name hierarchy to provide more efficient processing by the ICN nodes. If latency is the dominating element, the latency may appear higher on the naming hierarchy than the service, such as /latency:10 ms/FFT. Thus, a node performing a longest prefix match may reject (e.g., not respond) the request when it has no resources with less than a ten-millisecond latency.

As noted above with respect to FIG. 1, a directory service may be employed to locate resources or to act as a broker to help identify and match resources. The directory may maintain content with ICN nodes and catalogue the available resources. In an example, the directory service may ensure that resources are available and locked for a time-period. For example, a directory server, acting as a broker, may query devices in its vicinity for resources matching the requestor's interest packet. The responding devices may communicate their capacity to address the request as well as a time-period for which the resources will be locked and available. In an example, the resource availability automatically expires if the requestor does not follow up with an interest for a specific resource within the specified lock period. In an example, the requestor may request a minimum lock period for the requested resources.

In an example, available devices perform a resource lock a set (e.g., predetermined) period and then free those resources unless data is received from the requesting device. In an example, requestor or the responder may use an augmented publish-subscribe technique for exchanging information that include the "resource lock period" in addition to other resource discovery capabilities. This last example operates by overloading the standard interest and data packets of ICNs rather than creating a new class of discovery interest or data packets.

Another scenario described above with respect to FIG. 1 is the possibility of moving computing resources onto a requesting node so that the data may be processed locally. Using the example illustrated in FIG. 2, device 1 205 sends the interest packet 207 containing a requested service, application conditions, and optional next service to route results (default is back to device 1) into the ICN 200. In this example, the service is transcode1, the condition is 12 gigabytes of memory, and there are no next service elements. Given the conditions, no device replies because none meet the criteria (e.g., device 4 220 has the transcode service but not enough memory). However, device 1 205 has enough memory and the service, and so processes Data X itself. If device 1 205 did not have the transcode1 service, device 1 205 may have received it from device 4 220. That is, the offload mechanisms may include algorithms transmission through the data plane—nodes may share algorithms between themselves based on need. Thus, if node A is instructed to perform face detection, node A may request a microservice from node B to perform the face detection. Depending on the type of computations to be performed, the requesting node, or an intermediate node, may evaluate whether it is easier to move the algorithms to the node with the data or move the data to the node with the computational capabilities (e.g., algorithm or hardware). In an example, a micro service container (e.g., a docker container) may be provided in addition to the algorithm. The microservice container englobes support facilities, such as an operating system, libraries, licenses, etc.) for the algorithm to run.

FIG. 3 illustrates an example of a forwarding interest base (FIB) table 305 and a computational forwarding interest base (C-FIB) table 310, according to an embodiment. The FIB table 305 illustrates typical entries for standard ICNs; namely a data name (or portion of a data name) and a next hop. Thus, if an interest for /weatherdata/Saturday were to arrive at the node with the FIB table 305, the node would forward the interest on to the PUBLISHER 1 node. The C-FIB table 310 is different, however, than standard ICN FIB tables. Specifically, the C-FIB table 310 includes a computational resource field and an attributes field. This enhanced data structure permits a more flexible matching of resource availability to request parameters than may otherwise be possible in a standard FIB table.

Figure 4:
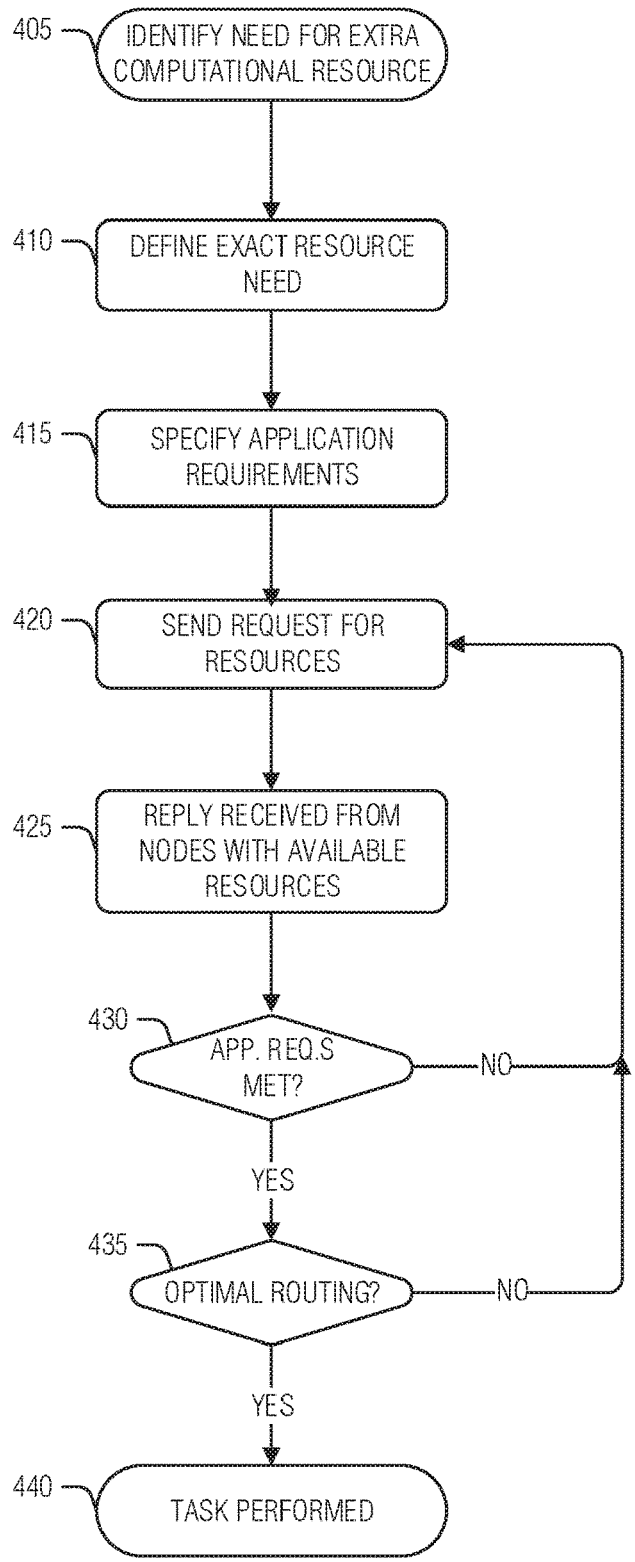
FIG. 4 illustrates a flow diagram of an example of a method for distributed computing resources in an ICN, according to an embodiment.

FIG. 4 illustrates a flow diagram of an example of a method 400 for distributed computing resources in an ICN, according to an embodiment. The operations of the method 400 are implemented by computer hardware, such as that described above, or described below with respect to FIG. 6 (e.g., circuitry). The method 400 embodies an enhanced ICN routing framework that may be used to send data along with code and request computations in return. consider an ICN (e.g., as illustrated in FIG. 1 or 2), where devices are interconnected via content routers.

If a first device wants to perform computation X over data Y, the first device determined whether additional computational resources are desirable or needed (operation 405). If the additional resources are desirable or needed, the first device defines parameters of the resource needs (e.g., computation X) (operation 410) and application requirements (e.g., one-second latency) (operation 415). The first device sends an interest packet (operation 420) with metadata indicating: that this is a request for computation X; and application requirements that must be met (e.g., one-second latency), which is not found in traditional ICN information requests. The interest packet also the algorithm for X and the data Y within a data section of the interest packet. In an example, the data section or the metadata of the interest packet may include a minimum period for which available resources are needed.

After the interest packet is transmitted, a reply is received form another ICN node (operation 425). The contents of the reply are analyzed to determine whether the application requirements are met (decision 430) and whether an optimal, or acceptable, routing is met (decision 435). If either of these decisions are unsatisfactory, the method 400 returns to operation 420 (to send out another interest packet). If the results of these two decisions are acceptable, the first device initiates performance of the task on the responder (operation 440).

To address this new interest packet format with respect to ICN routing, a C-FIB table (e.g., as shown in FIG. 3) may be employed by ICN nodes. While traditional routing tables contain the location of a data name and the next node that the packet will be forwarded to find the data, the C-FIB table is a routing table that indicates the next node for a particular type of hardware resource. For example, given a first content router that has the ability to perform FFT, a second device that has parallel processing hardware (e.g., a GPU) and ability to run deep learning algorithms, and a second content router is between the first device and either the first content router or the second device: if the first device requests FFT, the second content router performs a C-FIB table lookup to discover the route to the first content router. On the other hand, if the first device requests deep learning, the second router will forward the packet to the second device after the C-FIB table lookup.

C-FIB tables may be populated in a similar manner to traditional ICN routing tables. In case the type of computation requested is not listed in the C-FIB, an ICN nodes may forward the packets to all the nodes. When a response is returned from a particular node, that particular node is listed in the C-FIB table for future routing.

Once the second device receives the interest packet, the second device sends out an ACK packet indicating that the second device will fulfil the request. The ACK halts other nodes from forwarding the packet. When the first device sends out the interest packet to perform the computation, the first device also subscribes to receiving ACKS to its request. The interest and ACK packets may also be augmented with lock period indicating a time limit on resource availability.

Once the computations are completed, the second device communicates the result in a data packet responding to the original interest packet sent by the first device. If the computations need to be split among multiple nodes, the ICN control plane of multiple ICN nodes may submit the interest packet for different chunks of the data. These then are collected by an ICN node that plays the role of result aggregator, aggregating the results from the multiple nodes as they are completed.

Again, it is contemplated that, instead of distributing data for computation at remote nodes, the requestor may also request executable code (e.g., algorithms) to execute on the data locally. This feature may be desirable, for example, if it is communication intensive to move the data and the software to processes the data is locally executable had requires fewer communications resources. In this example, the requestor sends an interest packet for the "data processing algorithm" and may also indicate attributes of the algorithm in the request. The requestor may also use the directory server as a broker to find a large range of algorithms.

Figure 5:
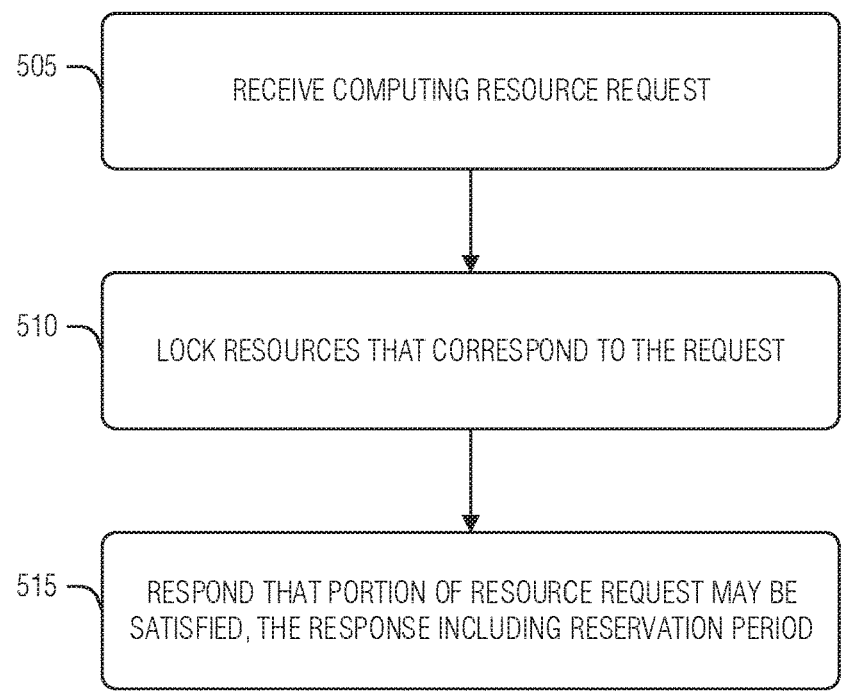
FIG. 5 illustrates a flow diagram of an example of a method for distributed computing resources in an ICN, according to an embodiment.

FIG. 5 illustrates a flow diagram of an example of a method 500 for distributed computing resources in an ICN, according to an embodiment. The operations of the method 500 are implemented by computer hardware, such as that described above, or described below with respect to FIG. 6 (e.g., circuitry).

At operation 505, a request is received at a node in the ICN. In an example, the request includes identification of a computing resource set and a timing threshold.

At operation 510, resources that correspond to a member of the computing resource set are locked.

At operation 515, a response to the request is communicated from the node. In an example, the response includes an indication that performance of the member of the computing resource is possible and a time-period in which confirmation may be received (e.g., to secure the resource to complete the computation).

The method 500 may be extended to include the operations of receiving an action request to perform a task on the resources, performing the task on the resources, and responding to the action request with performance results from the task. In an example, the method 500 may be extended to include the operations of determining that a second member of the computing resource set cannot be met by the node—the second member corresponding to a second task in the action request and the second task using the performance results as an input—communicating an interest for the second member of the computing resources set, receiving a reply from a second node in response to the interest for the second member, and communicating the second task and the performance results to the second node. In an example, the second node made the request. In an example, the second member included an algorithm that the node had but the second node did not have. Here, communicating the second task to the second node includes communicating the algorithm to the second node.

In an example, the method 500 may be extended to include the operations of maintaining, at the node, a computational forwarding interest base (C-FIB) for routes to other nodes. In an example, the method 500 also includes the receiving a computational resources interest packet. Here, maintaining the C-FIB includes adding an entry to the C-FIB for a device that responds to the computation resources interest packet. In an example, the C-FIB entry includes a type identification, a value, or a node. In an example, the type is one of an algorithm, a performance metric, or storage. In an example, the node in the entry is a next hop in the information centric network to a provider node.

In an example, the node is a directory and the resources are not on the node. Here, the response indicates a second node that hosts the resources. In an example, locking the resources includes communicating a lock to the second node. In an example, the lock includes a timeout. In an example, the second node removes a local lock on the resources when the timeout expires without further communication from the node. In an example, locking the resources includes maintaining a local lock at the node without communicating to the second node. Here, the node refrains from responding to other requests concerning the resources while the local lock is effective.

In an example, the method 500 includes obtaining computing resource inventories from a set of nodes and using the computing resource inventories to respond to computing resource requests. In an example, obtaining the computing resources inventories includes communicating a discovery interest to the information centric network and receiving a response from a member of the set of nodes to the discovery interest. In an example, the discovery interest includes a time-to-live parameter. Here, the discovery interest is not removed from information centric node pending interest tables until the time-to-live expires regardless of the number of transmissions that are provided in response to the discovery interest.

The systems, devices, and techniques described above allow ICN to better facilitate IoT and other fog computing use cases. This is accomplished via advertising, locating, and orchestrating resources for computation and storage. The enhanced ICN may also incorporate application level requirements into the data or computation routing decision making process. To ensure that signaling overhead is managed and yet available resources remain so to a requestor, a time lock was described to secure the resources for the requestor. Further, the enhanced ICN intelligently allocates computation by also considering whether it is more efficient to move the data to be processed at another node, or whether to move computation capabilities to the node hosting the data to allow the data to be processed locally.

Figure 6:
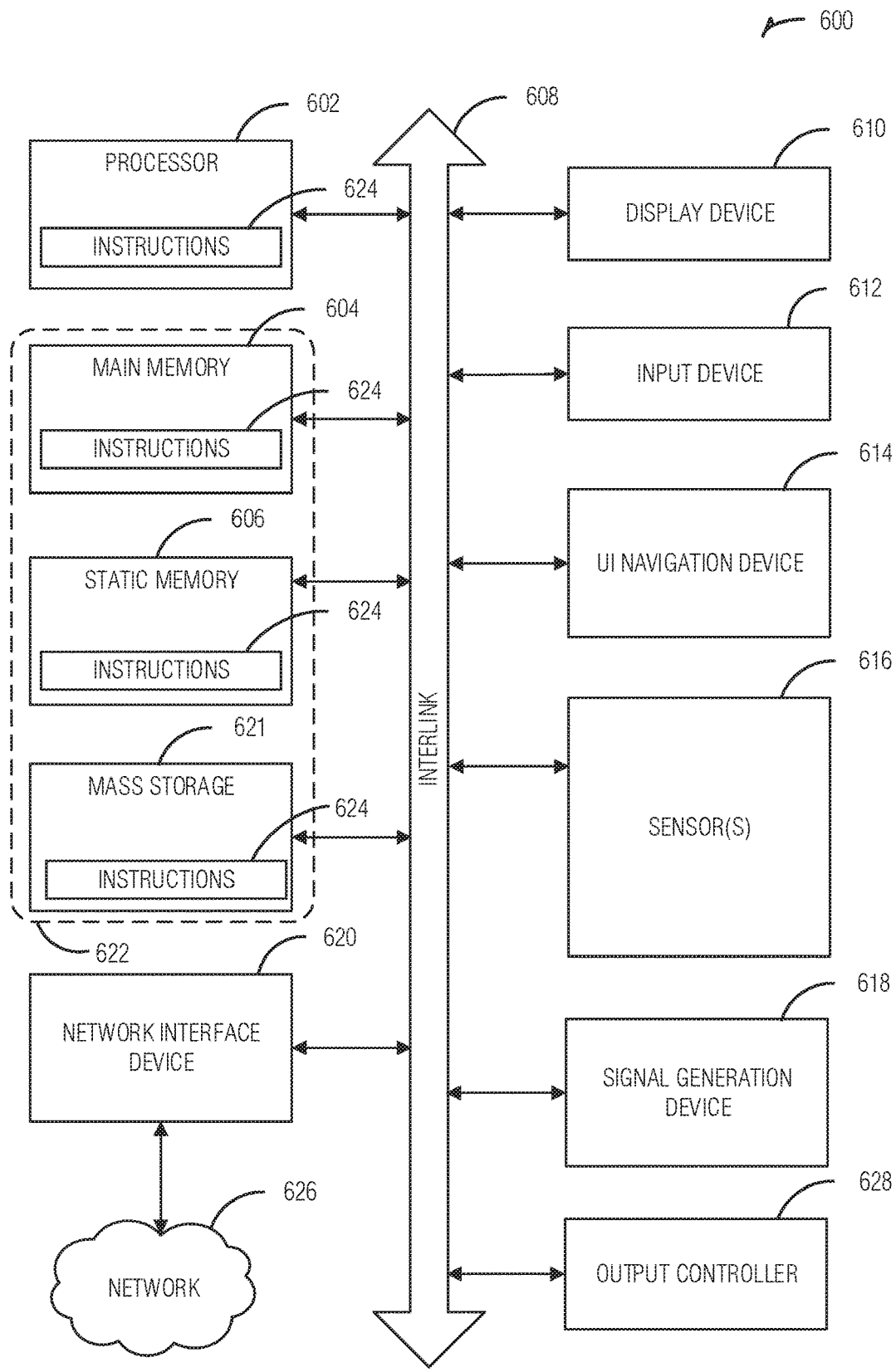
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. Examples, as described herein, may include, or may operate by, logic, one or more components, or one or more mechanisms in the machine 600. Circuitry (e.g., processing circuitry) is a collection of circuits implemented in tangible entities of the machine 600 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (CPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 621 (e.g., hard drive, tape drive, flash storage, or other block devices) some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 616 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 616 during execution thereof by the machine 600. In an example, one or any combination of the hardware processor 602, the main memory 604, the static memory 606, or the mass storage 616 may constitute the machine readable media 602. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

Additional Notes & Examples

Example 1 is a system for distributed computing resources in an information centric network, the system comprising: a network interface to receive a request at a node in the information centric network, the request including identification of a computing resource set and a timing threshold; and a controller to: lock resources that correspond to a member of the computing resource set; and communicate a response to the request, the response including an indication that performance of the member of the computing resource is possible and a time-period in which confirmation may be received.

In Example 2, the subject matter of Example 1 optionally includes wherein the node is a directory, wherein the resources are not on the node, and wherein the response indicates a second node that hosts the resources.

In Example 3, the subject matter of Example 2 optionally includes wherein, to lock the resources, the controller is to communicate a lock to the second node.

In Example 4, the subject matter of Example 3 optionally includes wherein the lock includes a timeout, the second node removing a local lock on the resources when the timeout expires without further communication from the node.

In Example 5, the subject matter of any one or more of Examples 2-4 optionally include wherein, to lock the resources, the controller is to maintain a local lock at the node without communicating to the second node, the node refraining from responding to other requests concerning the resources while the local lock is effective.

In Example 6, the subject matter of any one or more of Examples 2-5 optionally include wherein the controller is to: obtain computing resource inventories from a set of nodes; and use the computing resource inventories to respond to computing resource requests.

In Example 7, the subject matter of Example 6 optionally includes wherein, to obtain the computing resources inventories, the controller is to: communicate a discovery interest to the information centric network; and receive a response from a member of the set of nodes to the discovery interest.

In Example 8, the subject matter of Example 7 optionally includes wherein the discovery interest includes a time-to-live parameter, and wherein the discovery interest is not removed from information centric node pending interest tables until the time-to-live expires regardless of a number of transmissions that are provided in response to the discovery interest.

In Example 9, the subject matter of any one or more of Examples 1-8 optionally include wherein the controller is to: receive an action request to perform a task on the resources; perform the task on the resources; and respond to the action request with performance results from the task.

In Example 10, the subject matter of Example 9 optionally includes wherein the controller is to: determine that a second member of the computing resource set cannot be met by the node, the second member corresponding to a second task in the action request, the second task using the performance results as an input; communicate an interest for the second member of the computing resources set; receive a reply from a second node in response to the interest for the second member; and communicate the second task and the performance results to the second node.

In Example 11, the subject matter of Example 10 optionally includes wherein the second node made the request.

In Example 12, the subject matter of Example 11 optionally includes wherein the second member included an algorithm, wherein the node had the algorithm, wherein the second node did not have the algorithm, and wherein communicating the second task to the second node includes communicating the algorithm to the second node.

In Example 13, the subject matter of any one or more of Examples 1-12 optionally include wherein the controller is to maintain, at the node, a computational forwarding interest base (C-FIB) for routes to other nodes.

In Example 14, the subject matter of Example 13 optionally includes wherein the controller is to receive a computational resources interest packet, and wherein maintaining the C-FIB includes adding an entry to the C-FIB for a device that responds to the computation resources interest packet.

In Example 15, the subject matter of any one or more of Examples 13-14 optionally include wherein a C-FIB entry includes a type identification, a value, and a node.

In Example 16, the subject matter of Example 15 optionally includes wherein the type is one of an algorithm, a performance metric, or storage.

In Example 17, the subject matter of any one or more of Examples 15-16 optionally include wherein the node in the entry is a next hop in the information centric network to a provider node.

Example 18 is a method for distributed computing resources in an information centric network, the method comprising: receiving a request at a node in the information centric network, the request including identification of a computing resource set and a timing threshold; locking resources that correspond to a member of the computing resource set; and communicating, from the node, a response to the request, the response including an indication that performance of the member of the computing resource is possible and a time-period in which confirmation may be received.

In Example 19, the subject matter of Example 18 optionally includes wherein the node is a directory, wherein the resources are not on the node, and wherein the response indicates a second node that hosts the resources.

In Example 20, the subject matter of Example 19 optionally includes wherein locking the resources includes communicating a lock to the second node.

In Example 21, the subject matter of Example 20 optionally includes wherein the lock includes a timeout, the second node removing a local lock on the resources when the timeout expires without further communication from the node.

In Example 22, the subject matter of any one or more of Examples 19-21 optionally include wherein locking the resources includes maintaining a local lock at the node without communicating to the second node, the node refraining from responding to other requests concerning the resources while the local lock is effective.

In Example 23, the subject matter of any one or more of Examples 19-22 optionally include obtaining computing resource inventories from a set of nodes; and using the computing resource inventories to respond to computing resource requests.

In Example 24, the subject matter of Example 23 optionally includes wherein obtaining the computing resources inventories includes: communicating a discovery interest to the information centric network; and receiving a response from a member of the set of nodes to the discovery interest.

In Example 25, the subject matter of Example 24 optionally includes wherein the discovery interest includes a time-to-live parameter, and wherein the discovery interest is not removed from information centric node pending interest tables until the time-to-live expires regardless of a number of transmissions that are provided in response to the discovery interest.

In Example 26, the subject matter of any one or more of Examples 18-25 optionally include receiving an action request to perform a task on the resources; performing the task on the resources; and responding to the action request with performance results from the task.

In Example 27, the subject matter of Example 26 optionally includes determining that a second member of the computing resource set cannot be met by the node, the second member corresponding to a second task in the action request, the second task using the performance results as an input; communicating an interest for the second member of the computing resources set; receiving a reply from a second node in response to the interest for the second member; and communicating the second task and the performance results to the second node.

In Example 28, the subject matter of Example 27 optionally includes wherein the second node made the request.

In Example 29, the subject matter of Example 28 optionally includes wherein the second member included an algorithm, wherein the node had the algorithm, wherein the second node did not have the algorithm, and wherein communicating the second task to the second node includes communicating the algorithm to the second node.

In Example 30, the subject matter of any one or more of Examples 18-29 Optionally include maintaining, at the node, a computational forwarding interest base (C-FIB) for routes to other nodes.

In Example 31, the subject matter of Example 30 optionally includes receiving a computational resources interest packet, and wherein maintaining the C-FIB includes adding an entry to the C-FIB for a device that responds to the computation resources interest packet.

In Example 32, the subject matter of any one or more of Examples 30-31 optionally include wherein a C-FIB entry includes a type identification, a value, and a node.

In Example 33, the subject matter of Example 32 optionally includes wherein the type is one of an algorithm, a performance metric, or storage.

In Example 34, the subject matter of any one or more of Examples 32-33 optionally include wherein the node in the entry is a next hop in the information centric network to a provider node.

Example 35 is at least one machine readable medium including instructions that, when executed by processing circuitry, cause the processing circuitry to perform any method of Examples 18-13.

Example 36 is a system include means to perform any method of Examples 18-13.

Example 37 is at least one machine readable medium including instructions for distributed computing resources in an information centric network, the instructions, when executed by processing circuitry, cause the processing circuitry to perform operations comprising: receiving a request at a node in the information centric network, the request including identification of a computing resource set and a timing threshold; locking resources that correspond to a member of the computing resource set; and communicating, from the node, a response to the request, the response including an indication that performance of the member of the computing resource is possible and a time-period in which confirmation may be received.

In Example 38, the subject matter of Example 37 optionally includes wherein the node is a directory, wherein the resources are not on the node, and wherein the response indicates a second node that hosts the resources.

In Example 39, the subject matter of Example 38 optionally includes wherein locking the resources includes communicating a lock to the second node.

In Example 40, the subject matter of Example 39 optionally includes wherein the lock includes a timeout, the second node removing a local lock on the resources when the timeout expires without further communication from the node.

In Example 41, the subject matter of any one or more of Examples 38-40 optionally include wherein locking the resources includes maintaining a local lock at the node without communicating to the second node, the node refraining from responding to other requests concerning the resources while the local lock is effective.

In Example 42, the subject matter of any one or more of Examples 38-41 optionally include wherein the operations include: obtaining computing resource inventories from a set of nodes; and using the computing resource inventories to respond to computing resource requests.

In Example 43, the subject matter of Example 42 optionally includes wherein obtaining the computing resources inventories includes: communicating a discovery interest to the information centric network; and receiving a response from a member of the set of nodes to the discovery interest.

In Example 44, the subject matter of Example 43 optionally includes wherein the discovery interest includes a time-to-live parameter, and wherein the discovery interest is not removed from information centric node pending interest tables until the time-to-live expires regardless of a number of transmissions that are provided in response to the discovery interest.

In Example 45, the subject matter of any one or more of Examples 37-44 optionally include wherein the operations include: receiving an action request to perform a task on the resources; performing the task on the resources; and responding to the action request with performance results from the task.

In Example 46, the subject matter of Example 45 optionally includes wherein the operations include: determining that a second member of the computing resource set cannot be met by the node, the second member corresponding to a second task in the action request, the second task using the performance results as an input; communicating an interest for the second member of the computing resources set; receiving a reply from a second node in response to the interest for the second member; and communicating the second task and the performance results to the second node.

In Example 47, the subject matter of Example 46 optionally includes wherein the second node made the request.

In Example 48, the subject matter of Example 47 optionally includes wherein the second member included an algorithm, wherein the node had the algorithm, wherein the second node did not have the algorithm, and wherein communicating the second task to the second node includes communicating the algorithm to the second node.

In Example 49, the subject matter of any one or more of Examples 37-48 optionally include wherein the operations include maintaining, at the node, a computational forwarding interest base (C-FIB) for routes to other nodes.

In Example 50, the subject matter of Example 49 optionally includes wherein the operations include receiving a computational resources interest packet, and wherein maintaining the C-FIB includes adding an entry to the C-FIB for a device that responds to the computation resources interest packet.

In Example 51, the subject matter of any one or more of Examples 49-50 optionally include wherein a C-FIB entry includes a type identification, a value, and a node.

In Example 52, the subject matter of Example 51 optionally includes wherein the type is one of an algorithm, a performance metric, or storage.

In Example 53, the subject matter of any one or more of Examples 51-52 optionally include wherein the node in the entry is a next hop in the information centric network to a provider node.

Example 54 is a system for distributed computing resources in an information centric network, the system comprising: means for receiving a request at a node in the information centric network, the request including identification of a computing resource set and a timing threshold; means for locking resources that correspond to a member of the computing resource set; and means for communicating, from the node, a response to the request, the response including an indication that performance of the member of the computing resource is possible and a time-period in which confirmation may be received.

In Example 55, the subject matter of Example 54 optionally includes wherein the node is a directory, wherein the resources are not on the node, and wherein the response indicates a second node that hosts the resources.

In Example 56, the subject matter of Example 55 optionally includes wherein the means for locking the resources includes means for communicating a lock to the second node.

In Example 57, the subject matter of Example 56 optionally includes wherein the lock includes a timeout, the second node removing a local lock on the resources when the timeout expires without further communication from the node.

In Example 58, the subject matter of any one or more of Examples 55-57 optionally include wherein the means for locking the resources includes means for maintaining a local lock at the node without communicating to the second node, the node refraining from responding to other requests concerning the resources while the local lock is effective.

In Example 59, the subject matter of any one or more of Examples 55-58 optionally include means for obtaining computing resource inventories from a set of nodes; and means for using the computing resource inventories to respond to computing resource requests.

In Example 60, the subject matter of Example 59 optionally includes wherein the means for obtaining the computing resources inventories includes: means for communicating a discovery interest to the information centric network; and means for receiving a response from a member of the set of nodes to the discovery interest.

In Example 61, the subject matter of Example 60 optionally includes wherein the discovery interest includes a time-to-live parameter, and wherein the discovery interest is not removed from information centric node pending interest tables until the time-to-live expires regardless of a number of transmissions that are provided in response to the discovery interest.

In Example 62, the subject matter of any one or more of Examples 54-61 optionally include means for receiving an action request to perform a task on the resources; means for performing the task on the resources; and means for responding to the action request with performance results from the task.

In Example 63, the subject matter of Example 62 optionally includes means for determining that a second member of the computing resource set cannot be met by the node, the second member corresponding to a second task in the action request, the second task using the performance results as an input; means for communicating an interest for the second member of the computing resources set; means for receiving a reply from a second node in response to the interest for the second member; and means for communicating the second task and the performance results to the second node.

In Example 64, the subject matter of Example 63 optionally includes wherein the second node made the request.

In Example 65, the subject matter of Example 64 optionally includes wherein the second member included an algorithm, wherein the node had the algorithm, wherein the second node did not have the algorithm, and wherein communicating the second task to the second node includes communicating the algorithm to the second node.

In Example 66, the subject matter of any one or more of Examples 54-65 optionally include means for maintaining, at the node, a computational forwarding interest base (C-FIB) for routes to other nodes.

In Example 67, the subject matter of Example 66 optionally includes means for receiving a computational resources interest packet, and wherein maintaining the C-FIB includes adding an entry to the C-FIB for a device that responds to the computation resources interest packet.

In Example 68, the subject matter of any one or more of Examples 66-67 optionally include wherein a C-FIB entry includes a type identification, a value, and a node.

In Example 69, the subject matter of Example 68 optionally includes wherein the type is one of an algorithm, a performance metric, or storage.

In Example 70, the subject matter of any one or more of Examples 68-69 optionally include wherein the node in the entry is a next hop in the information centric network to a provider node.

Example 71 is at least one machine-readable medium including instructions, which when executed by a machine, cause the machine to perform operations of any of the operations of Examples 1-70.

Example 72 is an apparatus comprising means for performing any of the operations of Examples 1-70.

Example 73 is a system to perform the operations of any of the Examples 1-70.

Example 74 is a method to perform the operations of any of the Examples 1-70.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for distributed computing resources in an information centric network, the information centric network being a network in which information itself is named and requested from the network instead of specifying an address of a host to retrieve information, the system in a first node and comprising:

network interface circuitry to:
        receive a first interest packet that identifies a first task to be completed and a time limit for completing the first task;
        create an entry corresponding to the first interest packet in a pending interest table (PIT) of the first node;
        receive a second interest packet for a computing resource that is not available on the first node;
        create an entry corresponding to the second interest packet in the PIT;
        forward the second interest packet onto the information centric network;
        receive a response to the second interest packet from a device, the response to the second interest packet indicating that the computing resource is available on the device;
        receive a third interest packet for the computing resource; and
        forward the third interest packet to a next hop to the device using an identifier of the next hop that is included in a computational forwarding interest base (C-FIB) entry; and controller circuitry to:
        lock computing resources on the first node that are required to complete the first task;
        communicate a response to the first interest packet in accordance with the corresponding PIT entry, the response to the first interest packet including an indication that performance of the first task is possible and a time-period during which the computing resources are locked, wherein the locked computing resources are released if confirmation to perform the first task is not received within the time-period;
        communicate a response to the second interest packet in accordance with the corresponding PIT entry;
        add the C-FIB entry in response to receipt of the response to the second interest packet, the entry including a type of the computing resource that is available on the device, one or more attributes of the computing resource that is available on the device, and the identifier of the next hop to the device, wherein the next hop is not the device.

2. The system of claim 1, wherein the controller circuitry is to:
    receive a fourth interest packet that includes a confirmation to perform the first task;

perform the first task using the locked computing resources; and respond to the fourth interest packet, in accordance with the PIT, with performance results from the first task.

3. The system of claim 2, wherein the controller circuitry is to:

determine that a second task identified in the fourth interest packet cannot be performed by the first node, the second task using the performance results as an input;

communicate a fifth interest packet that identifies the second task to the information centric network;

receive a reply from a second node in response to the fifth interest packet; and communicate the second task and the performance results to the second node.

4. The system of claim 3, wherein the fourth interest packet originated from the second node.

5. The system of claim 4, wherein the second task requires an algorithm, wherein the first node has the algorithm, wherein the second node does not have the algorithm, and wherein communicating the second task to the second node includes communicating the algorithm to the second node.

6. A method for distributed computing resources in an information centric network, the information centric network being a network in which information itself is named and requested from the network instead of specifying an address of a host to retrieve information, the method performed by a first node and comprising:

receiving a first interest packet that identifies a first task to be completed and a time limit for completing the first task;

creating an entry corresponding to the first interest packet in a pending interest table (PIT) of the first node;

locking computing resources on the first node that are required to complete the first task;

communicating, from the first node, a response to the first interest packet in accordance with the corresponding PIT entry, the response to the first interest packet including an indication that performance of the first task is possible and a time-period during which the computing resources are locked, wherein the locked computing resources are released if confirmation to perform the first task is not received within the time-period;

receiving a second interest packet for a computing resource that is not available on the first node;

creating an entry corresponding to the second interest packet in the PIT;

forwarding the second interest packet onto the information centric network;

receiving a response to the second interest packet from a device, the response to the second interest packet indicating that the computing resource is available on the device;

communicating a response to the second interest packet in accordance with the corresponding PIT entry;

adding an entry to a computational forwarding interest base (C-FIB) in response to receipt of the response to the second interest packet, the entry including a type of the computing resource that is available on the device, one or more attributes of the computing resource that is available on the device, and an identifier of a next hop to the device, wherein the next hop is not the device;

receiving a third interest packet for the computing resource; and forwarding the third interest packet to the next hop to the device using the identifier of the next hop that is included in the C-FIB entry.

7. The method of claim 6, comprising:

receiving a fourth interest packet that includes a confirmation to perform the first task;

performing the first task using the locked computing resources; and responding to the fourth interest packet, in accordance with the PIT, with performance results from the first task.

8. The method of claim 7, comprising:

determining that a second task identified in the fourth interest packet cannot be performed by the first node, the second task using the performance results as an input;

communicating a fifth interest packet that identifies the second task to the information centric network;

receiving a reply from a second node in response to the fifth interest packet; and communicating the second task and the performance results to the second node.

9. The method of claim 8, wherein the fourth interest packet originated from the second node.

10. The method of claim 9, wherein the second task requires an algorithm, wherein the first node has the algorithm, wherein the second node does not have the algorithm, and wherein communicating the second task to the second node includes communicating the algorithm to the second node.

11. At least one non-transitory machine readable medium including instructions for distributed computing resources in an information centric network, the information centric network being a network in which information itself is named and requested from the network instead of specifying an address of a host to retrieve information, the instructions, when executed by processing circuitry of a first node, cause the processing circuitry to perform operations comprising:

receiving a first interest packet that identifies a first task to be completed and a time limit for completing the first task;

creating an entry corresponding to the first interest packet in a pending interest table (PIT) of the first node;

locking computing resources on the first node that are required to complete the first task;

communicating, from the first node, a response to the first interest packet in accordance with the corresponding PIT entry, the response to the first interest packet including an indication that performance of the first task is possible and a time-period during which the computing resources are locked, wherein the locked computing resources are released if confirmation to perform the first task is not received within the time-period;

receiving a second interest packet for a computing resource that is not available on the first node;

creating an entry corresponding to the second interest packet in the PIT;

forwarding the second interest packet onto the information centric network;

receiving a response to the second interest packet from a device, the response to the second interest packet indicating that the computing resource is available on the device;

communicating a response to the second interest packet in accordance with the corresponding PIT entry;

adding an entry to a computational forwarding interest base (C-FIB) in response to receipt of the response to the second interest packet, the entry including a type of the computing resource that is available on the device, one or more attributes of the computing resource that is available on the device, and an identifier of a next hop to the device, wherein the next hop is not the device;

receiving a third interest packet for the computing resource; and forwarding the third interest packet to the next hop to the device using the identifier of the next hop that is included in the C-FIB entry.

12. The at least one machine readable medium of claim 11, wherein the operations include:

receiving a fourth interest packet that includes a confirmation to perform the first task;

performing the first task using the locked computing resources; and responding to the fourth interest packet, in accordance with the PIT, with performance results from the first task.

13. The at least one machine readable medium of claim 12, wherein the operations include:

determining that a second task identified in the fourth interest packet cannot be performed by the first node, the second task using the performance results as an input;

communicating a fifth interest packet that identifies the second task to the information centric network;

receiving a reply from a second node in response to the fifth interest packet; and communicating the second task and the performance results to the second node.

14. The at least one machine readable medium of claim 13, wherein the fourth interest packet originated from the second node.

15. The at least one machine readable medium of claim 14, wherein the second task requires an algorithm, wherein the first node has the algorithm, wherein the second node does not have the algorithm, and wherein communicating the second task to the second node includes communicating the algorithm to the second node.

* * * * *